Patented Sept. 4, 1934

1,972,134

UNITED STATES PATENT OFFICE 1,972,134

ACYL DERIVATIVES OF CELLULOSE

Henry Dreyfus, London, England

No Drawing. Original application March 21, 1929, Serial No. 348,980. Divided and this application October 15, 1930, Serial No. 488,832. In Great Britain April 18, 1928

14 Claims. (Cl. 260—101)

This invention is a divisional application from my application S. No. 348,980 and relates to a new series of cellulose derivatives.

The new compounds which form the subject of the present invention are acyl-oxy-acyl derivatives of cellulose. These derivatives may be produced by the esterification of cellulose derivatives containing hydroxy-acyl-groups such as are described and claimed in my co-pending application S. No. 348,980. The hydroxy acyl cellulose derivatives may be mono di- or tri-derivatives, that is to say, the compounds obtained by introducing 1, 2 or 3 hydroxy acyl groups into the cellulose molecule, or they may be intermediate derivatives formed, for example, by introducing into the cellulose molecule less than three but more than two acyl groups. The most valuable products are obtained from derivatives containing three, or between two and three hydroxy acyl groups. The invention includes mixed derivatives containing simple acyl groups as well as acyl-oxy-acyl groups.

The hydroxy acids from which the compounds of the present invention may be regarded as derived include glycollic acid, lactic acid, hydracrylic acid, and in fact any convenient hydroxy aliphatic acid. In order to produce the compounds of the invention the hydroxy acyl derivatives of cellulose may be reacted with any suitable esterifying agent, for example, acetic anhydride.

Instead of reacting upon a hydroxy acyl derivative of cellulose with an esterifying agent, it is in some cases of advantage to react directly upon cellulose with the anhydride of the hydroxy acid in the presence of a suitable esterifying catalyst, for example sulphuric acid and then to react upon the hydroxy acyl derivative present in the reaction mixture with an agent capable of esterifying one or more hydroxy groups in the said hydroxy acyl derivatives. In this way an acyl-oxy-acyl-derivative of cellulose may be produced without any separation of the intermediate hydroxy-acyl derivative. Thus by reacting upon cellulose first with glycollic anhydride in the presence of sulphuric acid, and then treating the reaction mixture containing cellulose glycollate with acetic anhydride the cellulose acetyl-glycollate may be obtained, without any separation of cellulose glycollate. By suitably adjusting the conditions of the esterification which constitutes the second stage in this process it is possible not only to esterify one or more of the hydroxy acyl groups, but also to introduce further acyl groups into the cellulose molecule. In this way mixed derivatives containing both acyl-oxy-acyl-groups and simple acyl groups are produced. Thus by treating a lower cellulose glycollate with acetic anhydride a mixed cellulose acetate acetyl-glycollate may be obtained directly.

Whether the starting material be cellulose itself or a hydroxy acyl derivative of cellulose, the esterification may be carried out in any convenient manner. For example, it may be conducted in the presence of a solvent or mixture of solvents for the cellulose derivative produced. Acetic acid or other lower fatty acids (with the exception of formic acid) may, for example, be employed. The invention is however not limited to the use of any particular solvent.

The esterification may further be conducted in suspension in non-solvent liquid diluents. If desired solvents may be present in addition to the non-solvent diluents.

In order to avoid degradation of the cellulose molecule the esterification is preferably conducted at as low a temperature as possible. Temperatures not substantially exceeding 50° C. for example, 20 to 30° C., atmospheric temperatures, or temperatures below atmospheric, for example 0 to 10° C. are preferred. The temperature at which the esterification can be effected may be reduced by the employment of suitable esterification catalysts, especially halide catalysts; for example the chlorides of iron (ferric) tin (stannic) manganese, copper or cobalt used in conjunction with hydrochloric or other hydrohalide acids give useful results. Apart from halogen containing catalysts, examples of other suitable catalysts are sulphuric acid or organically substituted sulphuric acids, such as benzene sulphonic acid, bisulphates, for example sodium bisulphate, phosphoric acid and sulphuryl chloride. Further details regarding the employment of catalysts in the esterification process will be found in my co-pending application S. No. 348,980. The details regarding pre-treatment and esterification of various cellulosic materials given in the said prior specification are applicable to the present invention in the case where the starting material is cellulose and the acyl-oxy-acyl derivative is produced directly therefrom as described above.

In carrying out the process of the invention excellent results are obtained, for example, by reacting upon the glycollic ester of cellulose with acetic anhydride. By treating a lower cellulose glycollate with acetic anhydride a mixed cellulose acetate acetyl-glycollate may be obtained directly. Again by reacting upon cellulose first with glycollic anhydride in the presence of a suitable esterifying catalyst, such as sulphuric acid and then treating the reaction mixture containing cellulose glycollate with acetic anhydride the cellulose acetyl-glycollate may be obtained, without any separation of cellulose glycollate.

The following example is introduced in order to illustrate, without in any way limiting the invention:—

*Example*

100 parts by weight of cotton cellulose are pretreated with formic acid, for example by treatment with 500 to 1000 parts of formic acid of about 85% strength, allowing to stand for some hours in the cold and hydro-extracting, or by impregnating with about 15 parts of formic acid of 75 to 85% strength and allowing to stand for 8 to 12 hours. The material is then washed, centrifuged and dried, after which it is introduced into a mixture of 500 parts of acetic acid, 180 parts of glycollic anhydride and 10 parts of sulphuric acid. Heat is applied and, after allowing the reaction to continue for about 5 hours at 20 to 30° C., 400 parts of acetic anhydride containing a further 5 parts of sulphuric acid are added. Thereafter the reaction is conducted as in the manufacture of cellulose acetate. The mixed cellulose acetate acetyl-glycollate is very similar in solubility and other properties to cellulose acetate.

The cellulose derivatives of the present invention, whether they be simple acyl-oxy-acyl-derivatives or mixed derivatives containing simple acyl groups as well as acyl-oxy-acyl groups may be subjected to secondary treatments or reactions for the purpose of changing their solubilities. Such secondary treatments or reactions may, for example, be carried out in the presence of inorganic or organic acids or acid salts, the treatment being arrested when the required solubility has been reached. In carrying out the secondary treatments in the esterification mixture the esterification catalysts themselves are in most cases sufficient to effect any desired change in solubility properties.

The reaction mixture, (that is the solution obtained before any separation of cellulose acetate acetyl-glycollate) is treated with 50 to 80 parts of water at a temperature of about 35° C. The cellulose acetate acetyl-glycollate becomes progressively soluble in organic solvents, for example acetone, containing more and more water. The treatment is stopped when the required solubility has been reached.

While the secondary or further treatments of the primary products may with advantage be conducted at ordinary or moderate temperatures, the reaction may, if desired, be quickened by heating up to relatively high, or high temperatures, even up to 80 or 100° C. but in such cases the presence of free mineral acids is preferably avoided.

What I claim and desire to secure by Letters Patent is:—

1. Acyl-oxy-acyl derivatives of cellulose, the acyl group being attached to the oxyacyl group.

2. Mixed cellulose derivatives in which part of the nuclear hydroxyl groups are esterified by acyl groups and part by acyl-oxy-acyl groups.

3. Acetyl glycollates of cellulose, the acetyl group being attached to the glycollyl group.

4. Mixed celulose derivatives in which part of the nuclear hydroxyl groups are esterified by acetyl groups and part by acetyl-glycollyl groups.

5. Process for the production of cellulose derivatives, containing acyl-oxy-acyl groups in which the acyl group is attached to the oxyacyl group, comprising esterifying cellulose derivatives containing hydroxy-acyl groups.

6. Process for the production of cellulose derivatives containing acyl-oxy-acyl-groups in which the acyl group is attached to the oxyacyl group comprising esterifying cellulose derivatives containing hydroxy-acyl groups continuously with their production from cellulose.

7. Process for the production of cellulose derivatives containing acetyl-glycollyl groups in which the acetyl group is attached to the glycollyl group, comprising acetylating cellulose derivatives containing glycollyl groups.

8. Process for the production of cellulose derivatives containing acetyl-glycollyl groups in which the acetyl group is attached to the glycollyl group, comprising acetylating cellulose derivatives containing glycollyl groups continuously with their production by the esterification of cellulose.

9. Process for the production of derivatives of cellulose containing simple acyl groups as well as acyl-oxy-acyl groups in which the acyl group is attached to the oxyacyl group, which comprises reacting upon cellulose with a hydroxy acid esterifying agent and subsequently with a simple esterifying agent.

10. Process for the production of derivatives of cellulose containing acetyl groups as well as acetyl-glycollyl groups in which the acetyl group is attached to the glycollyl group, which comprises reacting upon cellulose with glycollyl anhydride and subsequently with acetic anhydride.

11. Process for the production of cellulose derivatives containing acyl-oxy-acyl groups, which comprises esterifying cellulose derivatives containing hydroxy-acyl groups and subjecting the resulting primary cellulose esters to the action of acidic substances for the purpose of changing their solubility characteristics.

12. Process for the production of cellulose derivatives containing acetyl-glycollyl groups in which the acetyl group is attached to the glycollyl group, which comprises acetylating cellulose derivatives containing glycollyl groups and subjecting the resulting primary cellulose derivatives to the action of substances having mineral acidity for the purpose of changing their solubility characteristics.

13. Partially hydrolyzed acyl-oxy-acyl derivatives of cellulose, in which the acyl group is attached to the oxyacyl group.

14. Partially hydrolyzed cellulose derivatives in which part of the nuclear hydroxyl groups are esterified by acetyl groups and part by acetyl-glycollyl groups.

HENRY DREYFUS.